April 18, 1933.  R. MEIJER  1,903,929
PROCESS AND APPARATUS FOR THE MANUFACTURE OF SWEATED PARAFFIN
FROM NONSWEATED PARAFFIN AND THE LIKE SUBSTANCES
Filed July 29, 1930   4 Sheets-Sheet 1
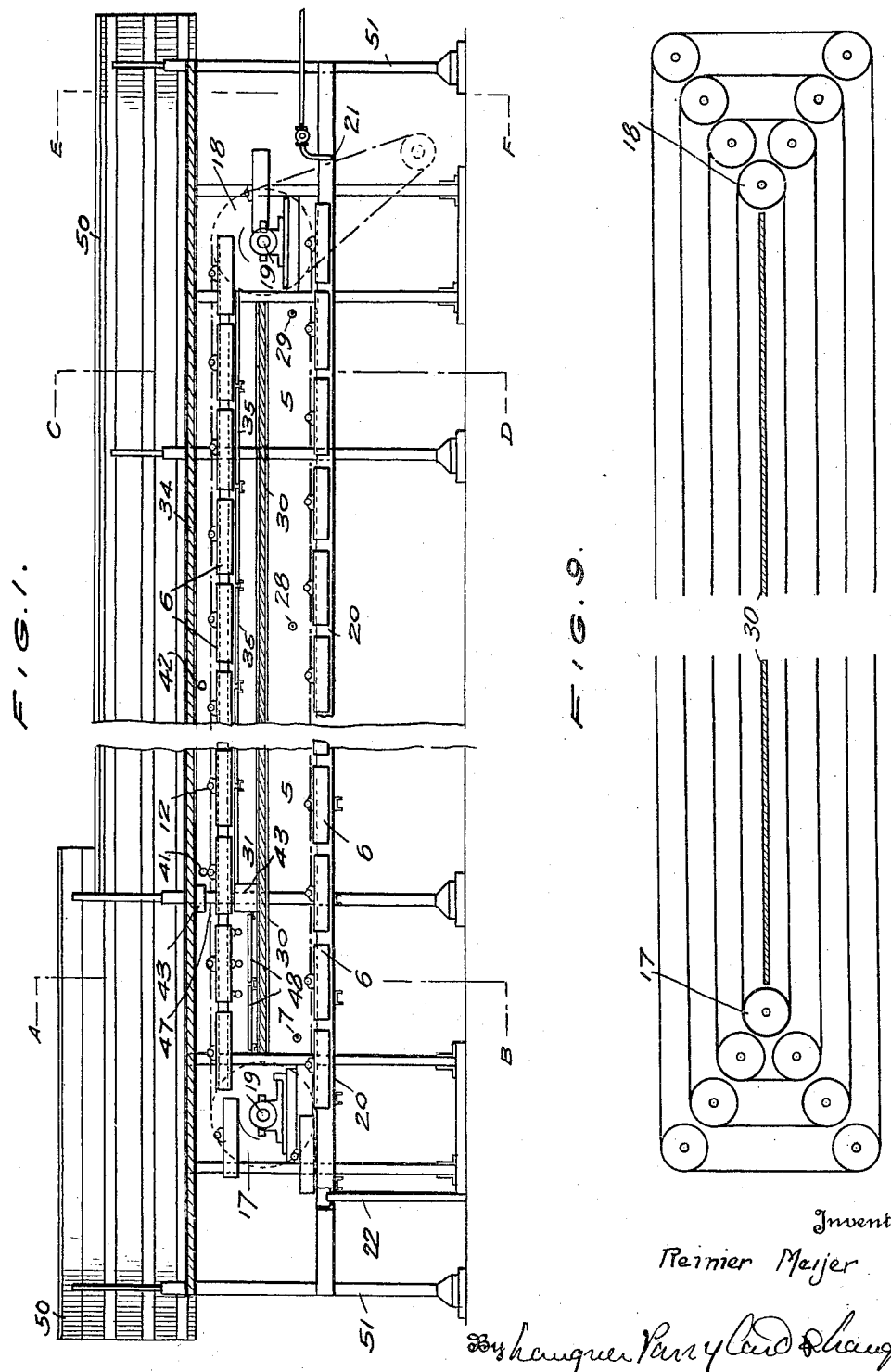
Inventor
Reimer Meijer

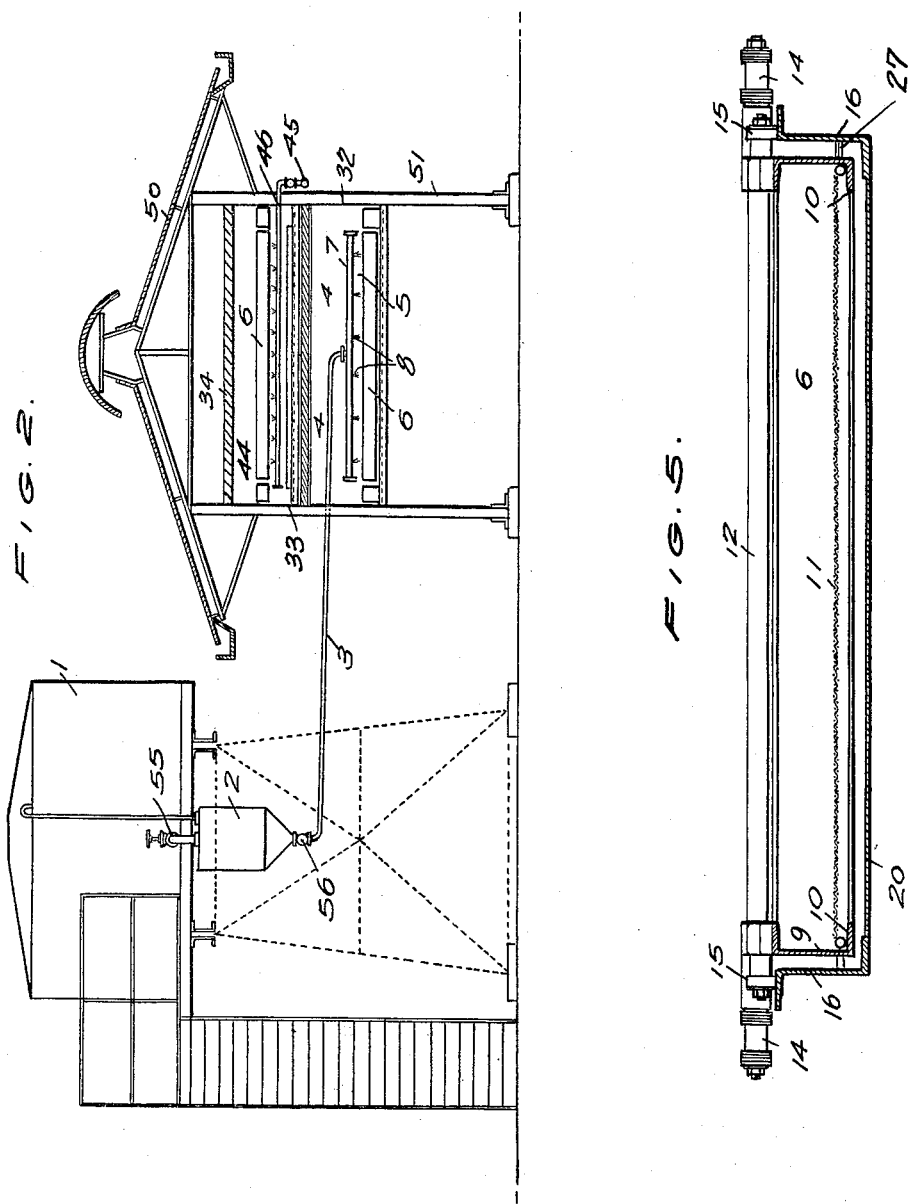

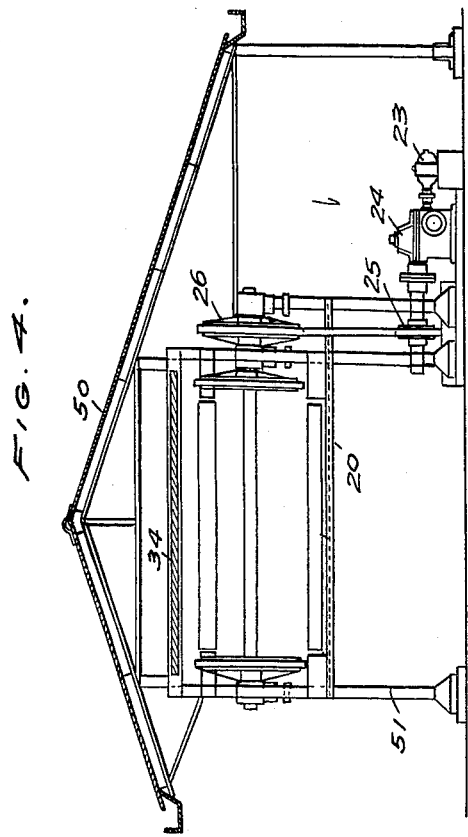
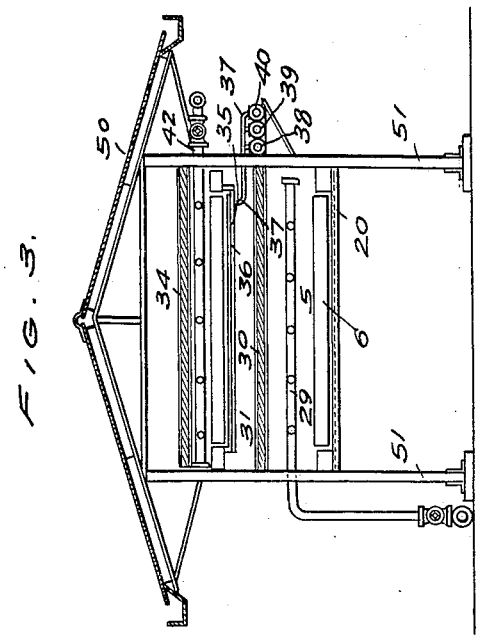
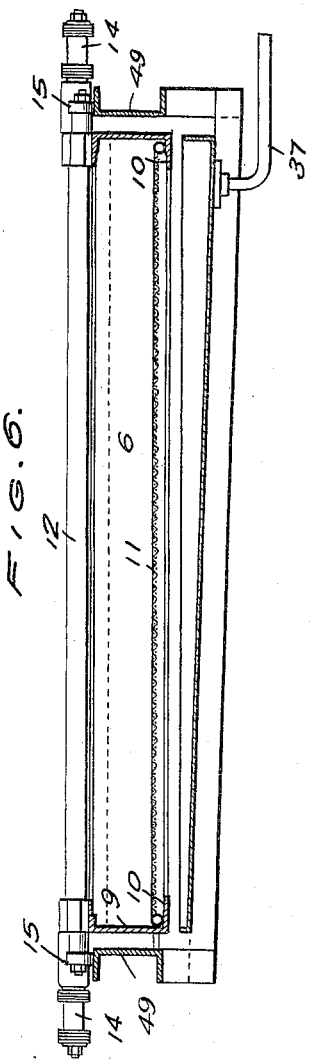

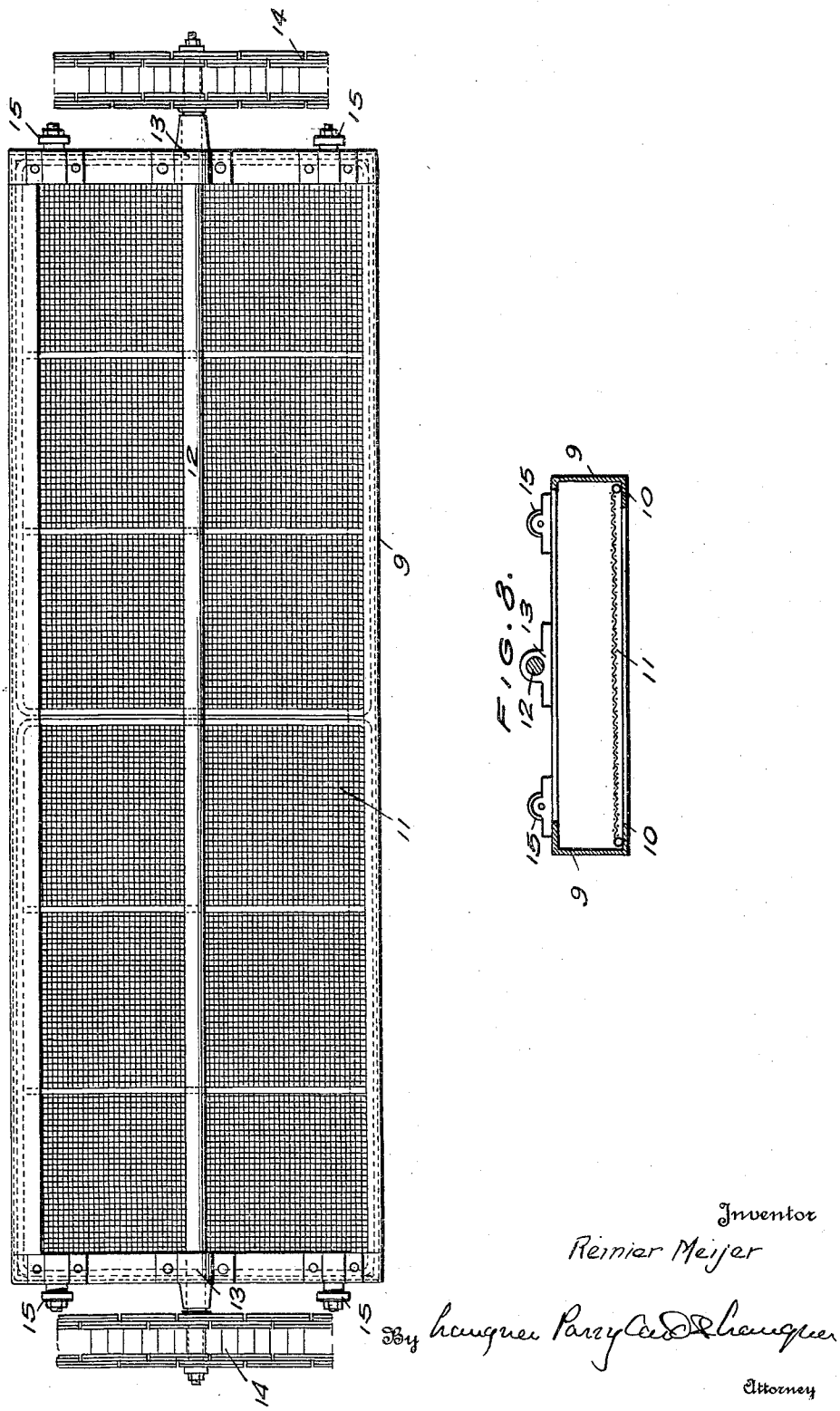

Patented Apr. 18, 1933

1,903,929

UNITED STATES PATENT OFFICE

REINIER MEIJER, OF THE HAGUE, NETHERLANDS, ASSIGNOR TO NAAMLOOZE VENNOOTSCHAP DE BATAAFSCHE PETROLEUM MAATSCHAPPIJ, OF THE HAGUE, NETHERLANDS

PROCESS AND APPARATUS FOR THE MANUFACTURE OF SWEATED PARAFFIN FROM NONSWEATED PARAFFIN AND THE LIKE SUBSTANCES

Application filed July 29, 1930, Serial No. 471,530, and in the Netherlands August 13, 1929.

The invention relates to a process for making sweated paraffin from non-sweated paraffin or such like substances, as well as an installation for the application of this process.

Various processes and installations are already known for the manufacture of paraffin from crude paraffin by means of the so-called sweating process. Substantially these processes consist in the crude paraffin being placed in the congealed state in a chamber which is heated to the required temperature and in which the lower melting components are sweated out. In Patent No. 1,070,730, for instance, a paraffin sweating oven is described which consists of a long tunnel-shaped chamber through which trucks loaded with a mass of non-sweated paraffin (Gatsch) travel on rails, while hot air is injected into the tunnel from the rear end. The fractions sweated out (sweated oil) are collected in gutters alongside the rails and conducted out of the oven.

The present invention concerns an improved method and a perfected installation for carrying out the process indicated above.

The process according to the invention comprises placing the liquid crude base material in trays or similar containers which are continuously passed through a chamber in which the material is caused to congeal, after which the trays are passed, also continuously, into another chamber following on the cooling passage, in which a temperature suitable for sweating is maintained and from which the sweated oil can be conducted away and, if necessary, fractionated.

The invention will now be explained with reference to the accompanying drawings.

Figure 1 represents a longitudinal section of an embodiment of the installation according to the invention, Figure 2 shows a section along the line A—B in Figure 1 and some further details with parts shown in elevation, Figure 3 is a section along the line C—D, Figure 4 is a section along the line E—F in Figure 1, Figure 5 is a sectional view of a part of the cooling passage with a paraffin or sweating tray in it, Figure 6 represents a section of a part of the sweating passage with a paraffin tray therein, Figures 7 and 8 show respectively a top view and a cross section of a sweating tray, and Figure 9 shows another embodiment of the process and installation according to the invention schematically.

The crude paraffinous oil is contained in the tank 1 (Fig. 2), which is connected to a measuring tank 2 by a valved pipe 55. From this measuring tank the trays are filled via the pipe 3 in which a valve 56 is provided. The stock tank 1, measuring tank 2 and pipe 3 are provided where necessary with means (not shown) for keeping the paraffinous oil in a liquid state. The pipe 3 leads into a space 4, where the paraffin or sweating trays are filled. This filling place forms the beginning of the cooling passage 5 through which the trays 6 are moved continuously. These trays, the construction of which will be further described below, can be filled, for instance, as shown in Fig. 2 by means of a pipe 7 with openings 8 attached to pipe 3 and extending over the whole breadth of the tray, which tends to ensure an even filling of the trays. The sweating trays (see Fig. 7) are rectangular in shape with comparatively low vertical sides 9 and with a loose bottom. A loose and easily removable bottom of metal gauze or a similar perforated material 11 rests on the horizontal edges 10. Along the middle of the tray is a rod 12 passing through bearings 13 placed on the ends of the tray. On both sides of the tray this rod is extended by extension pieces connecting with two endless chains 14, by means of which all the trays are transported. From the above it will be clear that the tray is free to swing on the rod or shaft 12. In order to keep the trays in a horizontal position, on either side of the gudgeons 13 small wheels 15 are fitted which rest on and roll along rails 16 placed on both sides of the cooling passage.

The chains 14 are conducted over the pairs of chain wheels 17 and 18 which revolve in the direction indicated by the arrows and which are fitted with tension bearings 19. The attachment of the trays shown in the sketch ensures their being kept in the same horizontal position when the chains are revolving over the chain wheels. The chain wheels can be driven in any suitable manner, for instance as shown in Fig. 4 by means of the motor 23, gearing 24 and belt pulleys 25 and 26. The rate of revolution of the chain wheels and thus also the speed at which the trays are transported can be regulated as desired.

The cooling passage 5 is a long chamber with a sink 20 at the bottom extending to underneath the chain wheels. The water flowing in this sink counter to the direction in which the trays travel is led in at 21 and carried off through the discharge pipe 22.

The level of the water in the sink 20 is adjusted in such a way that the gauze bottom 11 of the trays 6 is just immersed in the water. In Fig. 5 the water level is indicated by the line 27. The rails 16 form at the same time the sides of the sink 20. Cold air is also passed through the cooling passage, likewise counter to the direction in which the trays 6 travel. This cold air is injected into the cooling passage at 28 and 29.

The cooling passage 5 is separated from the sweating passage 31 above by means of a partition 30 covered with insulating material. The cooling and sweating passages are shut in by the side walls 32 and 33. Above the sweating passage is an insulated partition 34.

In the sweating passage, under the trays 6, which here run with their wheels 15 along the rails 49, there are trays 35 for catching the sweated out oil. These trays have a sloping bottom 36, at the lowest end of which a discharge pipe 37 is connected. These discharge pipes 37 of the collecting trays 35 empty into pipes 38, 39 and 40 (see Fig. 3) placed outside and lengthwise to the sweating passage. At 41 and 42 hot air is blown into the sweating passage counter to the direction in which the trays 6 travel.

At the end of the sweating passage is a thick partition 43 with an opening 47 just large enough to allow the trays 6 and chains to pass through. Behind this partition is the steaming chamber 44, in which there are some perforated pipes 46 connected to a steam pipe 45. The partition 43 serves to shut off the sweating passage from the steaming chamber, and as the thickness of this partition is greater than the distance between two sweating trays it affords a continuous shut-off while the plant is working. At the bottom of the steaming chamber there are two trays 48, in which the molten and purified paraffin is collected and run off. These trays may be constructed in the same manner as the trays 35 receiving the sweated oil.

The whole installation is built inside a structure 51 with roof 50 designed to catch the rain.

On the plant being started, the trays in the charging space 4 are filled by means of the pipe 3, the cold water and air feed pipes 21, 28 and 29 first being opened. The measuring tank 2 serves to measure the total quantity of crude paraffin treated. The pairs of chain wheels 17 and 18 are then set in motion so that the chain 14 with the trays 6 attached thereto begins to move in the direction leading from the filling chamber to and through the cooling passage 5 and thence via the chain wheel 18 through the sweating chamber. At the same time cold water and air flow through the cooling passage and filling chamber in the manner described. The liquid paraffin evenly spread out over the gauze bottom 11 of the sweating trays congeals on coming into contact with the cold water, so that the tray can be further filled with liquid crude paraffin, which on the way through the cooling passage likewise congeals. The velocity of the trays and the temperature of the cooling water and cooling air are regulated in such a way that by the time the paraffin in the trays reaches the end of the cooling passage it has been totally congealed.

The trays then pass up into the sweating passage above the cooling passage, into which hot air of about 70° C. is blown through the pipes 42. The oil sweating out and dripping through the gauze bottom is collected in the trays 35 and carried off via pipes 37 into various sweated oil discharge lines 38, 39 and 40 to the necessary receivers. It is apparent that in this way various fractions of sweated oil of different melting points can be collected.

Finally the trays with sweated paraffin pass through the opening 47 in the partition 43 into the steaming chamber 44, where superheated steam melts the purified paraffin, which is collected in the trays 48 and run off from there into the receivers for purified paraffin. The trays passing out of the steaming chamber can easily be cleaned and if necessary provided with new gauze bottoms before they reach the filling chamber again to be re-circulated with a fresh charge of crude paraffin.

From a constructive point of view, the advantage of the installation described above lies in the fact that in consequence of the cooling and sweating passages being placed one above the other only little space is occupied. The capacity of the installation can be doubled or enlarged several times by building several cooling and sweating passages above each other and passing more chains with trays through them, as indicated schematically in Fig. 9. In Fig. 9 the insulating partition 30 is shown and it is understood that a plurality of cooling chambers are provided on the lower side of the insulating partition 30 and a plurality of sweating chambers and steaming chambers are provided upon the upper side of the partition. It is evident that by this arrangement a considerable saving is obtained in material and power as compared with the same number of separate sweating installations. Other arrangements of the installation according to the invention are, however, also possible. For instance, the cooling and sweating passages might be placed side by side, which embodiment can also be multiplied in a similar manner.

A further advantage of the installation as shown schematically in Fig. 9 is the possibility of treating various base materials in one plant.

The installation described offers several important advantages. The whole working is continuous; charging takes place while the sweating trays are in motion. The trays can also be cleaned without interrupting the working. The rate of circulation of the trays can easily be adjusted according to the nature of the material treated. The sweated oil can be collected in fractions. The partition between the sweating passage and the steaming chamber prevents the temperature at the end of the sweating passage from getting too high so as to cause high-melting pure paraffin to be carried off together with the higher-melting sweated oil. The operation of the whole installation is very simple and if necessary can be carried out by one man. It is obvious that various modifications may be made within the scope of the invention in the arrangement thus described. The number of fractions of the sweated oil can be increased at will, the chain wheels may be driven in some other way, without deviating from the principle of the invention.

I claim:

1. A process for obtaining sweated paraffin from a non-sweated paraffinous mass and similar substances comprising filling trays having perforated bottoms with the liquid base material at the entrance of a cooling passage, conducting said trays through said cooling passage with the bottoms of the trays immersed in a stream of water flowing through said cooling passage and then leading said trays through a sweating chamber.

2. An apparatus for purifying paraffin and like substances comprising a cooling chamber, a sweating chamber, an insulating partition separating said cooling and sweating chambers, a steaming chamber located at one end of said sweating chamber, a thick walled partition separating said steaming chamber from said sweating chamber having an opening therein to permit of the passage of trays and other means of conveyance, a series of trays, endless chains to which said trays are attached, chain wheels located at the ends of said chambers for said chains, said trays being so positioned upon said chains that the space between adjacent trays is less than the thickness of said partition, means for attaching said trays to said chains so as to maintain said trays at all times in horizontal position, guiding means for said trays through said passages and means for filling the trays at the entrance of the cooling chamber with the liquid material to be treated.

3. An apparatus for purifying paraffin as set forth in claim 2 in which a plurality of cooling and sweating chambers are provided.

4. An apparatus for purifying paraffin comprising a series of chambers through which the mass to be purified is substantially continuously conducted, trays for conducting said mass, shaft bearings extending through the center of the side walls of said trays, a shaft passing through said bearings and extending beyond the walls upon each side of a tray, endless chains to which said extensions are connected, guide wheels upon said trays and tracks upon which said guide wheels may roll.

5. An apparatus for purifying paraffin comprising a series of chambers through which the mass to be purified is continuously conducted, trays for continuously conducting said mass to be purified, means for leading said trays with the material therein through said various chambers, the bottoms upon said trays being open and removable members covering said open bottoms.

6. An apparatus for purifying paraffin comprising a series of chambers through which the mass to be purified is continuously conducted, trays for continuously conducting said mass to be purified, means for leading said trays with the material therein through said various chambers, the bottoms upon said trays being open, and removable gauze members covering the open bottoms upon said trays.

In testimony whereof I have signed my name to this specification.

REINIER MEIJER.